United States Patent Office 2,766,230
Patented Oct. 9, 1956

2,766,230

COBALTIFEROUS AZO-DYESTUFFS

Arthur Buehler, Rheinfelden, and Christian Zickendraht, Binningen, Switzerland, assignors to Ciba Limited, Basel, Switzerland, a Swiss firm No Drawing. Application August 7, 1952,
Serial No. 303,154

Claims priority, application Switzerland August 7, 1951

10 Claims. (Cl. 260—145)

According to this invention valuable new cobaltiferous azo dyestuffs are made by treating a monoazodyestuff free from sulfonic acid and carboxylic acid groups and corresponding to the general formula (1)  $R\!-\!N\!=\!N\!-\!R_1$ in which R represents an aromatic radical of the benzene series free from sulfonic acid amide groups and containing a hydroxyl group in ortho-position relatively to the azo linkage, and $R_1$ represents the radical of a 1-acylamino-7-hydroxy-naphthalene bound in the 8-position to the azo linkage with an agent yielding cobalt under conditions such that the resulting cobaltiferous dyestuff contains less than one atom of cobalt in complex union per molecule of monoazodyestuff.

The monoazo-dyestuffs of the above formula used as starting materials in the present process can be made by coupling an ortho-hydroxy-diazo-compound of the benzene series, which is free from sulfonic acid, carboxylic acid and sulfonic acid amide groups, with a 1-acylamino-7-hydroxynaphthalene which is also free from sulfonic acid and carboxylic acid groups. There are used as ortho-hydroxydiazo compounds advantageously diazo compounds of ortho-hydroxy-amines of the benzene series, of which the benzene nucleus contains in addition to the hydroxyl and amino groups further substituents, such as halogen atoms, for example chlorine; alkyl groups, for example, methyl; alkoxy groups, for example methoxy; nitro groups; —CO=alkyl groups, for example, —CO—CH₃; acylamino groups, for example, acetylamino groups. As ortho-hydroxyaminobenzenes there come into consideration, for example, the following hydroxyamines: 4-methyl-2-amino-1-hydroxybenzene, 4-methoxy-2-amino-1-hydroxybenzene, 4-chloro-2-amino-1-hydroxybenzene, 4-nitro-2-amino-1-hydroxybenzene, 5-nitro-2-amino-1-hydroxybenzene, 6-acetylamino-4-chloro- or -4-nitro-2-amino-1-hydroxybenzene, 5-nitro-4-chloro-2-amino-1-hydroxybenzene, 6-nitro-4-chloro-2-amino-1-hydroxybenzene, 6-nitro-4-methyl-2-amino-1-hydroxybenzene, 3-amino-4-hydroxy-acetophenone, 6-nitro-4-acetylamino-2-amino-1-hydroxybenzene, 5-nitro-3-amino-4-hydroxyacetophenone, 2-amino-1-hydroxybenzene-4-carboxylic acid amide, 4:6-dinitro-2-amino-1-hydroxybenzene, 4:6-dichloro-2-amino-1-hydroxybenzene and 4-nitro-6-chloro-2-amino-1-hydroxybenzene.

The acyl radicals in the 1-acylamino-7-hydroxy-naphthalenes used as coupling components for making the monoazo-dyestuffs may be of any desired constitution, except that they must be free from sulfonic acid and carboxylic acid groups. Such acyl radicals are, for example, those of the aromatic series such as the benzoyl radical, or the benzene-sulfonyl radical or advantageously radicals of the general formula $$-CO-C_{n-1}H_{2n-1}$$

in which $n$ represents a whole number from 1 to 4. Among 1-acylamino-7-hydroxynaphthalenes there are included 7-hydroxynaphthyl-(1)-carbamic acid esters. As examples of 1-acylamino-7-hydroxy-naphthalenes there may be mentioned 1-formylamino-7-hydroxy-naphthalene, 1-acetylamino-7-hydroxynaphthalene, 1-propionylamino-7-hydroxynaphthalene, 1-n-butyrylamino-7-hydroxynaphthalene, 7-hydroxynaphthyl-(1)-carbamic acid methyl or ethyl ester, 7-hydroxynaphthyl-(1)-carbamic acid methyl glycol ester, 1-benzoylamino-7-hydroxynaphthalene and 1-benzenesulfonylamino- or 1-para-toluene-sulfonylamino-7-hydroxynaphthalene.

The coupling of the ortho-hydroxydiazo compounds with the 1-acylamino-7-hydroxynaphthalenes can be carried out by the usual known methods, advantageously in an alkaline medium, for example, a medium rendered alkaline with an alkali carbonate and/or an alkali hydroxide.

When the coupling reaction is finished the dyestuffs, for the purpose of metallization, can easily be separated from the coupling mixture by filtration, as they are only slightly soluble in water owing to the lack of groups imparting solubility. They are advantageously used in the form of filter cakes without intermediate drying. In some cases it is possible to carry out the treatment with the agent yielding cobalt directly in the coupling mixture without any intermediate separation.

The monoazo-dyestuffs obtainable as described above and serving as starting materials in the present process are in general not especially easily soluble in water even in the form of their alkali compounds. However, some of them dissolve sufficiently well in this form to enable them to be used for dyeing wool from dyebaths which require no addition of acid.

The treatment with an agent yielding cobalt is carried out in accordance with the invention in such manner that a cobaltiferous dyestuff is obtained which contains less than one atom of cobalt in complex union per molecule of monoazo-dyestuff. Accordingly, the metallization is advantageously carried out with such agents yielding cobalt and by such methods that complex cobalt compounds having this constitution are obtained. In general, it is desirable to use less than one atomic proportion of cobalt for every molecular proportion of a monoazo-dyestuff and/or to carry out the treatment with the agent yielding cobalt in a weakly acid to alkaline medium. Accordingly there are especially suitable for carrying out the process those cobalt compounds which are stable in alkaline media, such, for example, as complex cobalt compounds of aliphatic dicarboxylic acids or hydroxy-carboxylic acids, such, for example, as oxalic acid, lactic acid, glycollic acid, citric acid and especially tartaric acid. As agents yielding cobalt there can also be used in the present process, and indeed used with advantage, simple compounds of divalent cobalt such as cobalt sulfate or cobalt acetate, and also cobalt hydroxide.

The conversion of the dyestuffs into the complex cobalt compounds is advantageously carried out at a raised temperature, under atmospheric or superatmospheric pressure, if desired in the presence of suitable additions, for example, in the presence of salts of organic acids, bases, organic solvents or other agents assisting the formation of complexes.

In a special form of the process a mixture of different metallizable monoazo-dyestuffs is used as starting material, which dyestuffs correspond to the general definition given above. Treatment with the agent yielding cobalt is also in this case carried out in such manner that cobaltiferous dyestuffs are obtained which contain less than one atom of cobalt in complex union per molecule of monoazo-dyestuff.

The new products of the invention are complex cobalt compounds in which the ratio of the number of cobalt atoms bound in complex union to the number of monoazo-dyestuff molecules present in the complex is smaller than 1:1, and is advantageously about 1:2, and in which the monoazo-dyestuffs bound in complex union to the cobalt are free from sulfonic and carboxylic acid groups and correspond to the above general formula (1) 

in which R represents an aromatic radical of the benzene series free from sulfonic acid amide groups and containing a hydroxyl group in ortho-position relatively to the azo linkage, and $R_1$ represents the radical of a 1-acylamino-7-hydroxynaphthalene bound in the 8-position to the azo linkage.

The compounds of this kind are valuable which contain two monoazo-dyestuffs corresponding to the general Formula 1 each having the same constitution.

The new cobaltiferous dyestuffs are soluble in water and in weakly acid aqueous media, and are more soluble than the parent dyestuffs used for making them. They are suitable for dyeing or printing a very wide variety of materials, more especially for dyeing materials such as silk, leather and especially wool but also for dyeing or printing synthetic fibers of superpolyamides or superpolyurethanes. They are suitable above all for dyeing from weakly alkaline, neutral or weakly acid, especially acetic acid baths. The wool dyeings so obtained are distinguished by their level character, and good properties of wet fastness and good fastness to carbonizing and decatizing.

The following examples illustrate the invention, the parts and percentages being by weight unless otherwise stated and the relationship of parts by weight to parts by volume being the same as that of the kilogram to the liter.

*Example 1*

36.6 parts of the dyestuff obtained from diazotized 5-nitro-2-amino-1-hydroxybenzene and 1-acetylamino-7-hydroxynaphthalene are dissolved in 2000 parts of water with the addition of 8 parts of sodium hydroxide and the solution is heated to 80° C. To the resulting violet solution are added 100 parts of a solution, having a temperature of 80° C., of cobalt sulfate having a cobalt content of 3.25 percent. After stirring for ½ to 1 hour at 80° C., the metallization is finished. By the addition of acetic acid the green-blue solution is neutralized and then evaporated. The cobaltiferous dyestuff so obtained is a violet powder which dissolves in dilute sodium hydroxide solution with a blue coloration and in concentrated sulfuric acid with a violet coloration, and dyes wool from a neutral or from an acetic acid bath greyish green-blue tints, which are distinguished by good fastness to light and excellent fastness to washing, carbonizing and decatizing.

The dyestuff used in this example can be prepared, for example, as follows:

15.4 parts of 5-nitro-2-amino-1-hydroxybenzene are suspended in 150 parts of water and 20 parts of hydrochloric acid of 30 percent strength, and diazotized at 5–10° C. with a concentrated solution of 6.9 parts of sodium nitrite. The diazo compound is neutralized by the addition of sodium carbonate, and added to a solution, cooled with ice to 0° C., of 20.5 parts of 1-acetyl-amino-7-hydroxynaphthalene in 52 parts by volume of a 2 N-solution of sodium hydroxide and 30 parts by volume of a 2 N-solution of sodium carbonate. When the coupling is finished the resulting dyestuff is filtered off and washed with sodium chloride solution of 1 percent strength. The dry dyestuff is a brown-black powder which dissolves in hot water with a red-blue coloration and in concentrated sulfuric acid with a pure blue-red coloration.

*Example 2*

42.3 parts of the dyestuff obtained from diazotized 6-acetylamino-4-nitro-2-amino-1-hydroxybenzene and 1-acetylamino-7-hydroxynaphthalene are dissolved in 2000 parts of water with the addition of 8 parts of sodium hydroxide and heated to 80° C. To the resulting violet solution are added 100 parts of a solution, having a temperature of 80° C., of cobalt sulfate having a cobalt content of 3.25 percent. After stirring for ½ hour at 80° C., the metallization is finished. By the addition of sodium chloride the resulting cobalt complex is precipitated completely. When dry it is a black powder which dissolves in water with a dirty green coloration and in concentrated sulfuric acid with a red coloration, and dyes wool from a weakly alkaline or neutral or weakly acetic acid bath full greenish grey tints, which are distinguished by good fastness to light and excellent fastness to washing, decatizing and carbonizing.

A cobaltiferous dyestuff having similar properties is obtained by using instead of the monoazo dyestuff mentioned above the corresponding monoazo-dyestuff from 1-n-butyrylamino-7-hydroxynaphthalene.

*Example 3*

18.3 parts of the dyestuff obtained from diazotized 5-nitro-2-amino-1-hydroxybenzene and 1-acetylamino-7-hydroxynaphthalene and 21.15 parts of the dyestuff obtained from diazotized 6-acetylamino-4-nitro-2-amino-1-hydroxybenzene and 1-acetylamino-7-hydroxynaphthalene are dissolved in 1500 parts of water with the addition of 8 parts of sodium hydroxide, and the solution is mixed at 80° C. with 100 parts of a solution of cobalt sulfate having a cobalt content of 3.25 percent. After stirring for ½ hour at 80° C., the metallization is finished. By the addition of sodium chloride the cobalt complex separates even while hot. It is filtered off and, when dry, is a grey powder which dissolves in water with a green-grey coloration and in concentrated sulfuric acid with a bluish red coloration, and dyes wool from a weakly alkaline or neutral or acetic acid bath full greenish grey tints, which are distinguished by their excellent fastness to washing, decatizing and carbonizing.

Dyestuffs having similar properties are obtained by using, instead of the monoazo-dyestuffs mentioned above, those given in the following table and proceeding otherwise in an analogous manner. In columns A and B the two ortho:ortho' - dihydroxy - monoazo - dyestuffs bound in the complex to cobalt and in column C the tints obtainable by dyeing wool from an acetic acid or neutral bath are given.

| | A | B | C |
|---|---|---|---|
| 1 | | | grey. |
| 2 | | | bluish grey. |
| 3 | | | grey having an olive shade. |

*Example 4*

0.5 part of the cobaltiferous dyestuff obtained as described in the first paragraph of Example 1 is dissolved in 4000 parts of water, 10 parts of crystalline sodium sulfate are added, and 100 parts of well wetted wool are entered at 40–50° C. into the resulting dyebath. There are then added 3 parts of acetic acid of 40 percent strength, the bath is raised to the boil in the course of ½ hour and dyeing is carried on at the boil for ¾ hour. Finally the wool is rinsed with cold water and then dried. There is obtained a level greyish green-blue dyeing of good fastness to washing and light.

Practically the same dyeing is obtained when no acetic acid is added to the dyebath.

Instead of wool, there may be used 100 parts of superpolyamide fibers (nylon fibers) and in this case a greyish green-blue dyeing is also obtained.

What is claimed is:

1. A complex cobalt compound containing two monoazo dyestuffs so bound in complex union with a cobalt atom that the proportion of the number of cobalt atoms bound in complex union to the number of monoazo dyestuff molecules is substantially 1:2, and in which the two monoazo dyestuffs present are free from sulfonic acid and carboxylic acid groups and correspond to the formula

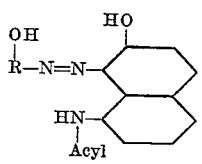

in which R represents a benzene radical which is bound to the azo linkage in ortho-position relatively to the hydroxyl group and which contains as sole substituent at least one and at most two members selected from the group consisting of a chlorine atom, a nitro group, and an acylamino group, whose acyl group is the acyl radical of an acid containing only carbon, hydrogen and oxygen atoms, and acyl is the radical of an acid containing only carbon, hydrogen and oxygen atoms.

2. A complex cobalt compound according to claim 1, in which the monoazo dyestuffs present have the same constitution.

3. A complex cobalt compound containing two monoazo dyestuffs so bound in complex union with a cobalt atom that the proportion of the number of cobalt atoms bound in complex union to the number of monoazo dyestuff molecules is substantially 1:2 and in which the two monoazo dyestuffs present are free from sulfonic acid and carboxylic acid groups and correspond to the formula $$\text{R}-\text{N}=\text{N}-\underset{\underset{\text{COC}_{n-1}\text{H}_{2n-1}}{\text{HN}-}}{\text{OH} \quad \text{HO}}$$

in which R represents a benzene radical which is bound to the azo linkage in ortho-position relatively to the hydroxyl group and which contains as sole substituent at least one and at most two members selected from the group consisting of a chlorine atom, a nitro group, and an acylamino group whose acyl group is the acyl radical of an acid containing only carbon, hydrogen and oxygen atoms, $n$ being a whole number up to 4.

4. A complex cobalt compound containing two monoazo dyestuffs so bound in complex union with a cobalt atom that the proportion of the number of cobalt atoms bound in complex union to the number of monoazo dyestuff molecules is substantially 1:2, and in which the two monoazo dyestuffs present correspond to the formula

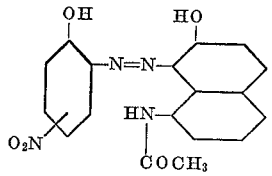

5. A complex cobalt compound containing two monoazo dyestuffs so bound in complex union with a cobalt atom that the proportion of the number of cobalt atoms bound in complex union to the number of monoazo dyestuff molecules is substantially 1:2, and in which the two monoazo dyestuffs present correspond to the formula

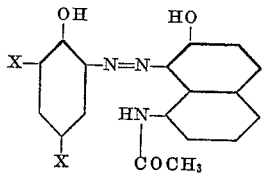

in which one X represents a nitro group and the other X an acetylamino group.

6. A complex cobalt compound containing two monoazo dyestuffs so bound in complex union with a cobalt atom that the proportion of the number of cobalt atoms bound in complex union to the number of monoazo dyestuff molecules is substantially 1:2, and in which one of the monoazo dyestuffs present corresponds to the formula

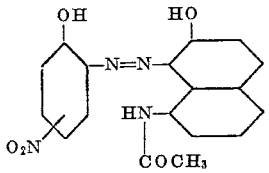

the other corresponding to the formula

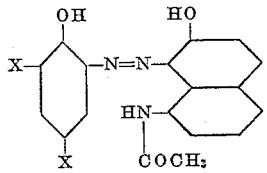

in which one X represents a nitro group and the other X an acetylamino group.

7. The complex cobalt compound containing one atom of cobalt bound in complex union to substantially two molecules of the monoazo dyestuff of the formula

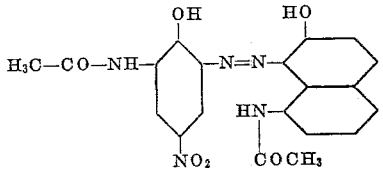

8. The complex cobalt compound containing one atom of cobalt bound in complex unit to substantially two molecules of the monoazo dyestuff of the formula

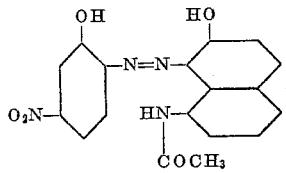

9. The complex cobalt compound containing one atom of cobalt bound in complex union to substantially two monoazo dyestuff molecules, in which compound one of the monoazo dyestuffs present corresponds to the formula

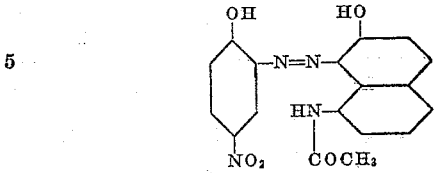

the other monazo dyestuff present in the complex compound corresponding to the formula

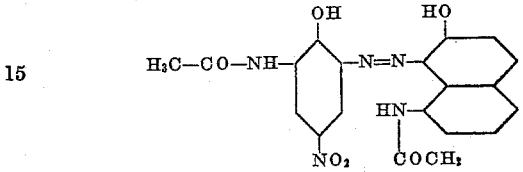

10. The complex cobalt compound containing one atom of cobalt bound in complex union to substantially two monoazo dyestuff molecules, in which compound one of the monoazo dyestuffs present corresponds to the formula

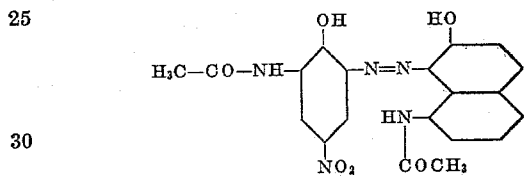

the other monoazo dyestuff present in the complex compound corresponding to the formula

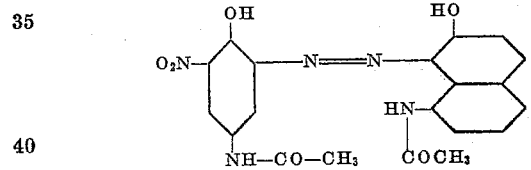

References Cited in the file of this patent
UNITED STATES PATENTS

| | | |
|---|---|---|
| 2,443,226 | Carson | June 15, 1948 |
| 2,551,056 | Schetty | May 1, 1951 |
| 2,602,080 | Grimmel et al. | July 1, 1952 |
| 2,610,175 | Widmer et al. | Sept. 9, 1952 |

OTHER REFERENCES

The Technical Bulletin, Du Pont Dyestuffs Div., vol. 1, No. 3, December 1945, page 137.